(12) United States Patent
Wang et al.

(10) Patent No.: US 7,212,116 B2
(45) Date of Patent: May 1, 2007

(54) RFID SYSTEM WITH AN ADAPTIVE ARRAY ANTENNA

(75) Inventors: James June-Ming Wang, San Marino, CA (US); Jack Winters, Middletown, NJ (US); Robert Warner, Holmdel, NJ (US)

(73) Assignee: Motia, Inc., Pasadena, CA (US)

( * ) Notice: Subject to any disclaimer, the term of this patent is extended or adjusted under 35 U.S.C. 154(b) by 168 days.

(21) Appl. No.: 11/009,098

(22) Filed: Dec. 10, 2004

(65) Prior Publication Data

US 2005/0128159 A1    Jun. 16, 2005

Related U.S. Application Data

(60) Provisional application No. 60/528,349, filed on Dec. 10, 2003.

(51) Int. Cl.
*G08B 13/14* (2006.01)
(52) U.S. Cl. ................ 340/571; 340/568.1; 340/572.7; 340/539.22; 343/700 R
(58) Field of Classification Search ................ 340/571, 340/568.1, 572.1, 825, 10.1, 540, 572.7, 340/5.8, 572.8, 5.6, 501, 572.5, 572.4, 505, 340/539.22, 440; 342/42, 51; 343/700 R
See application file for complete search history.

(56) References Cited

U.S. PATENT DOCUMENTS

| | | | | |
|---|---|---|---|---|
| 4,228,401 A | * | 10/1980 | Wachs et al. | 455/13.3 |
| 5,218,359 A | * | 6/1993 | Minamisono | 342/383 |
| 5,752,173 A | * | 5/1998 | Tsujimoto | 455/137 |
| 6,483,427 B1 | * | 11/2002 | Werb | 340/10.1 |
| 6,509,836 B1 | * | 1/2003 | Ingram | 340/572.4 |
| 6,903,656 B1 | * | 6/2005 | Lee | 340/572.1 |
| 2004/0169587 A1 | * | 9/2004 | Washington | 340/573.1 |

* cited by examiner

*Primary Examiner*—Daniel Wu
*Assistant Examiner*—Daniel Previl
(74) *Attorney, Agent, or Firm*—Patentry; Peter G H Hwang

(57) ABSTRACT

The present invention relates to use of a smart antenna for a RF reader on a Radio Frequency Identification (RFID) system to significantly increase the operating range of the RFID system. The smart antenna can be an adaptive antenna array. The smart antenna comprises a plurality of antenna elements and, by combining the signals from multiple antenna elements, significantly increases the received signal-to-noise ratio. In a noise limited environment, combining the signals to maximize the received signal-to-noise ratio can be based on the maximal ratio combining (MRC) principle. To achieve the best signal quality, the received signal from each antenna can be phase-shifted such that the resultant signals from all antennas are in phase. In addition, the signal from each antenna can be scaled in amplitude based on the square root of its received signal-to-noise ratio.

12 Claims, 4 Drawing Sheets

Figure 1 RFID System with Adaptive Array Antenna

RFID SYSTEM WITH AN ADAPTIVE ARRAY ANTENNA

CROSS REFERENCE TO RELATED APPLICATION

This application claims the benefit of U.S. Provisional Patent Application No. 60/528,349 filed Dec. 10, 2003 the entirety of which is hereby incorporated by reference into this application.

BACKGROUND OF THE INVENTION

1. Field of the Invention

This invention relates generally to a Radio Frequency Identification (RFID) system. More particularly, it relates to an adaptive antenna array for a RF reader for increasing the operating range of the RFID system.

2. Description of Related Art

A conventional Radio Frequency Identification (RFID) system consists of a reader and a plurality of RF tags. The RF reader transmits a radio signal containing a unique identification (ID) to poll one of a plurality of RF tags. The RF tag polled responds by sending back a radio signal. A variety of RFID systems have been used in different applications such as warehouse inventory control systems.

There are two types of conventional RFID systems: active and passive. The RF tag in the active RFID system requires power to operate. For the battery-powered active RF tag, it is desirable to have reduced power consumption so that the operating life can be extended. The RF tag in the passive RFID system derives and stores power from a RF signal transmitted by the RF reader and responds by transmitting back a signal by using the stored energy. Conventional RFID systems are limited to short range operation because of limited transmission power available on the return link from the RF tag to the RF reader. RFID systems typically contain a small number of RF readers and a large number of RF tags. The RF tags typically have limited complexity and low cost. Accordingly, the majority of the complex signal processing and the associated implementation are at the RF reader side. It is desirable to increase the operating range of the RFID system.

SUMMARY OF THE INVENTION

The present invention relates to use of a smart antenna for a RF reader on a Radio Frequency Identification (RFID) system to significantly increase the operating range of the RFID system. The smart antenna can be an adaptive antenna array. The smart antenna comprises a plurality of antenna elements and, by combining the signals from multiple antenna elements, significantly increases the received signal-to-noise ratio. In a noise limited environment, combining the signals to maximize the received signal-to-noise ratio can be based on the maximal ratio combining (MRC) principle. To achieve the best signal quality, the received signal from each antenna can be phase-shifted such that the resultant signals from all antennas are in phase. In addition, the signal from each antenna can be scaled in amplitude based on the square root of its received signal-to-noise ratio.

The invention will be more fully described by reference to the following drawings.

DETAILED DESCRIPTION

Figure 1:
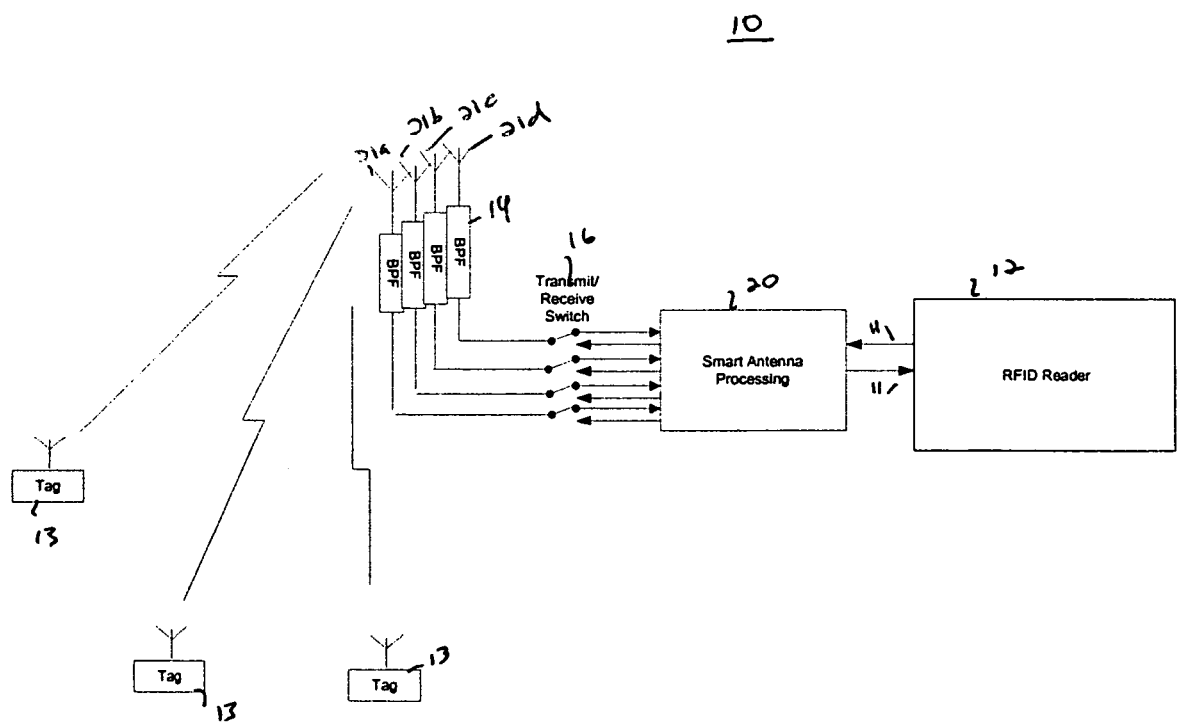
FIG. 1 is a schematic diagram of a RFID system with a smart antenna in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a schematic diagram of Radio Frequency Identification (RFID) system 10 in accordance with the teachings of the present invention.

RFID reader 12 transmits and receives signals 11 to and from RFID tags 13. RFID reader 12 includes smart antenna processing module 20 for adaptively combining signals from a plurality of antennas 21a–21d. Smart antenna processing module 20 is connected by transmit receive switches 16a–16d and bandpass filters 14a–14d to antennas 21a–21d. Smart antenna processing module 20 can combine signals 11 to maximize the received signal-to-noise ratio (SNR) based weights determined by maximal ratio combining (MRC).

There are various ways to determine the MRC weights. One embodiment adaptively adjusts the antenna weight by correlating each of the received signals with a combined signal as the received signal arrives. The correlation time determines the post-detection SNR of the weight computation. Increasing the correlation time allows optimal antenna weights to be achieved in very low signal-to-noise ratio environments. The signal-to-noise ratio improvements come from both the antenna combining gain and the diversity gain. With the MRC antenna weights, the received signals from different antennas can be coherently combined (i.e., in phase) while uncorrelated noise from different antennas is combined incoherently. As a result, the signal-to-noise ratio after the combining is increased. Additionally, the signals received by some antennas could experience fading, in which the signal strength could be reduced significantly. Combining signals from all the antennas reduces the probability of the signal fading in the output signal and thereby achieves diversity gain. For example, in 802.11b with a 2 element antenna array, 8 to 9 dB of SNR gain can be achieved in a Rayleigh fading environment. With a 4 element antenna array, 12 to 14 dB of SNR gain can be achieved in a Rayleigh fading environment.

Figure 2:
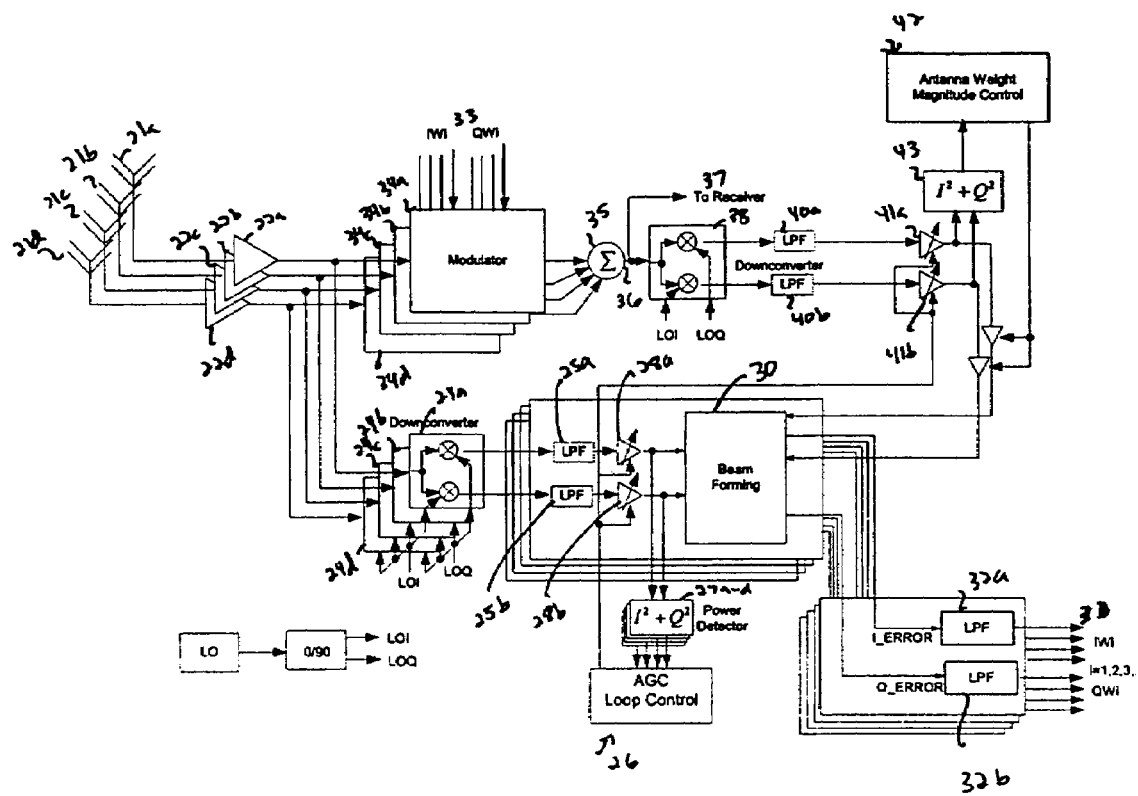
FIG. 2 is a schematic diagram of an implementation of smart antenna processing.

FIG. 2 shows an embodiment of smart antenna processing module 20 employing a closed loop adaptive signal processing operation for antenna weight computation and signal combining. A plurality of antennas 21a–21d may receive or transmit signals 11. The BPF and T/R switches from FIG. 1 can also be used. Signals 11 are amplified in amplifiers 22a–d. The outputs of amplifiers 22a–d are downconverted in respective downconverters 23a–d. Each of downconverters 23a–d multiplies the output of respective amplifiers 22a–d by a local oscillator in-phase signal (LOI) and a local oscillator quadrature phase signal (LOQ) in respective multipliers 24a–b. It will be appreciated that various numbers of antennas and processing elements could be used in accordance with the teachings of the present invention.

The resultant signals are applied to respective low-pass filters (LPF) 25a, 25b in automatic gain control (AGC) loop 26 that normalizes the signal level before the MRC algorithm. AGC loop 26 provides a consistent performance for smart antenna processing module 20 at different input signal levels. Variable gain amplifiers 28a, 28b are applied to the respective outputs of LPF 25a, 25b and MRC beamforming module 30. At the output of the variable gain amplifiers 28a, 28b, power detectors 27a–d are applied to sum the signal power of all antennas and compare the signal power to a threshold value. The difference between the signal power of all antennas and the threshold value can be integrated to maintain the signal level after AGC loop 26 at the same level and can be used to adjust the gain of variable gain amplifiers 28a, 28b. Accordingly, in this implementation, the MRC algorithm is able to work at different input signal levels.

MRC beamforming module 30 performs real time adaptive signal processing to obtain the maximum signal-to-noise ratio. In an implementation of MRC beamforming module 30 the antenna weights are used to align the phases of the four antenna signals received from antennas 21a–d and also scale the signal in proportion to the square-root of the signal-to-noise ratio in each individual channel. For example, in one implementation, the signal envelope is used as an approximation to scale the signal in proportion to the square-root of the signal-to-noise ratio in each individual channel. This approximation is accurate assuming the noise is the same in each channel and the SNR is high enough to be approximated accurately by the signal plus noise in each channel.

Figure 3:
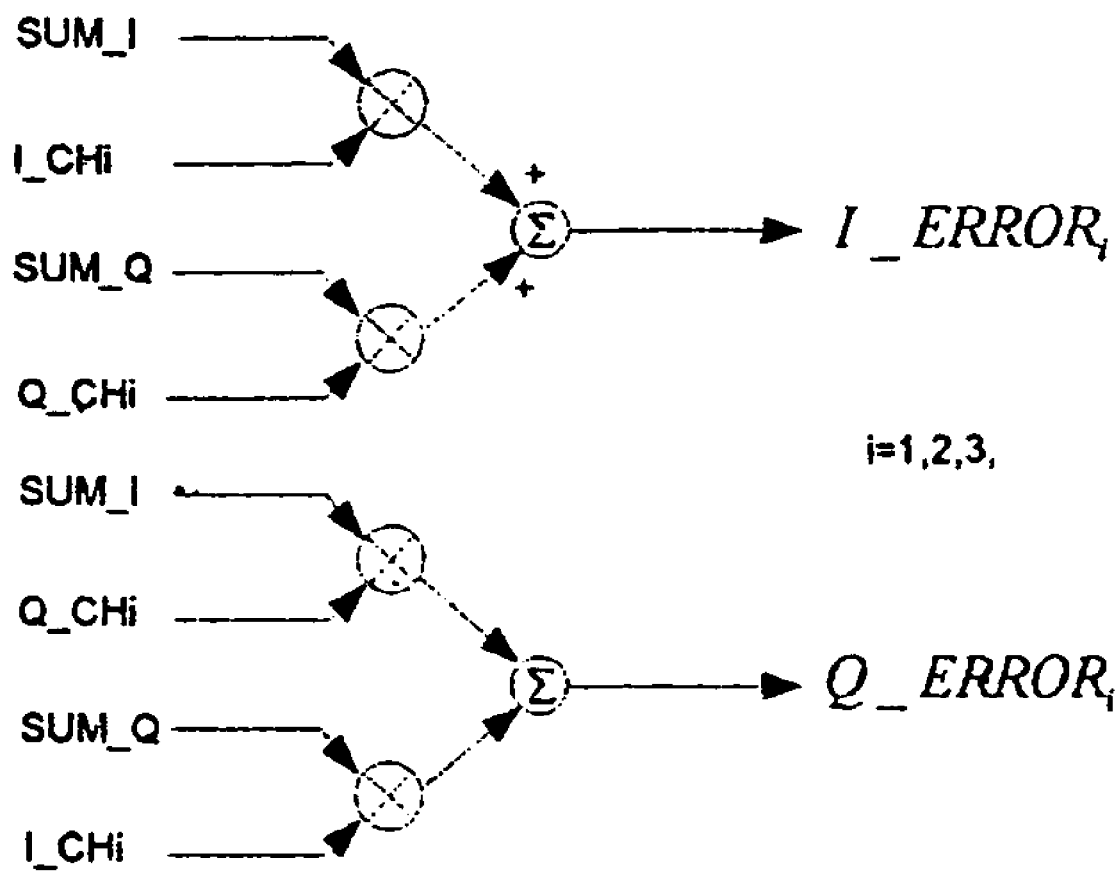
FIG. 3 is a schematic diagram of an implementation of a beamforming module which can be used in the smart antenna processing.

MRC beamforming module 30 can employ a Cartesian feedback loop, as shown in FIG. 3. MRC beamforming module 30 provides baseband processing which performs complex conjugate multiplication of the output of a baseband I and Q channel filter with a baseband reference I and Q channel as follows:

$$I\_ERROR_i = I_i * I_s + Q_i * Q_s$$

$$Q\_ERROR_i = I_i * Q_s - Q_i * I_s$$

The resultant signal (I_ERROR$_i$, Q_ERROR$_i$) at the output of MRC beamforming module 30 is a complex signal with phase equal to the difference of the reference complex signal and the individual signal and an envelope proportional to the envelope of the individual signal. Signal I_ERROR is applied to low-pass filter (LPF) 32a and signal Q_ERROR is applied to low-pass filter (LPF) 32b. The output of the LPF's 32a, 32b is antenna weight 33 (IWi, QWi, i=1,2,3, ... ). The antenna weights and combining are performed at an RF frequency.

The outputs of amplifiers 22a–d are applied to respective modulators 34a–d and are each multiplied by antenna weight 33. Accordingly, the antenna weight is implemented using a modulator in which the baseband control signals are used to create phase shift and amplitude scaling in the signal without the use of a phase shifter and variable gain amplifier. The outputs of modulators 34a–d are combined in summer 35 to generate combined output signal 36. The combined signal 36 is forwarded to receiver 37.

Combined signal 36 is applied to downconverter 38 and is multiplied by LOI and LOQ in respective multipliers 39a, 39b. The resultant signals are applied to low-pass filters (LPF) 40a, 40b. The outputs from the low-pass filters (LPF) 40a, 40b are amplified with quadrature phase signal amplifiers 41a, 41b and are applied to MRC beamforming module 30 to be used for updating antenna weight 33, as described above.

Figure 4:
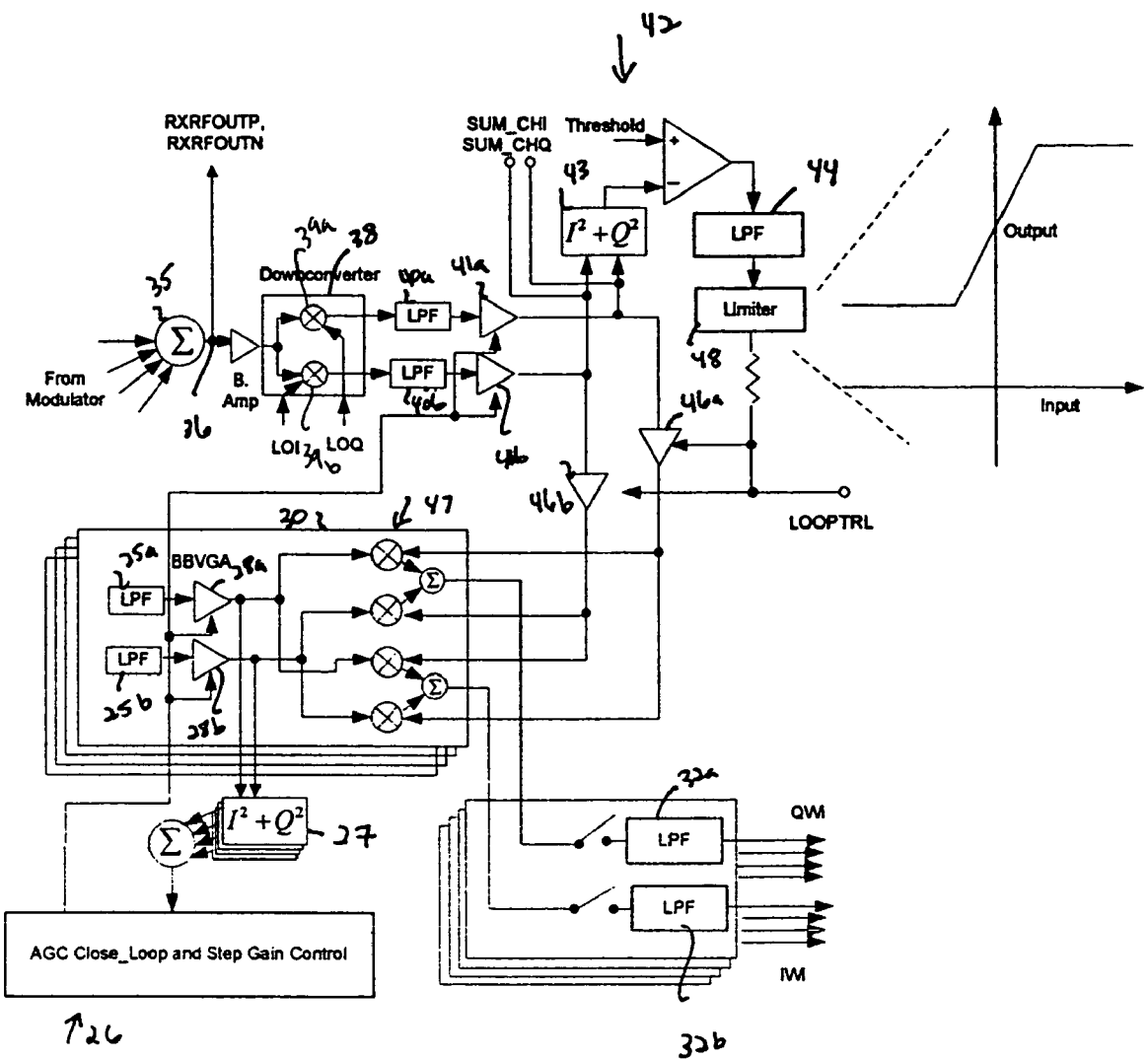
FIG. 4 is a schematic diagram of an implementation of smart antenna processing including a closed loop MRC implementation with antenna weight magnitude control.

It has been found that if the antenna weight setting produces a combined signal which is small in magnitude, the antenna weight thus derived can be small in magnitude, leading to a smaller set of weights. The combined signal thus derived can become small and be indistinguishable from circuit noise. The receiver noise figure degrades significantly. Also, if the initial weight produces a combined signal which is large in magnitude, the antenna weight thus derived leads to a set of large weights resulting in a larger combined signal which can saturate the circuit to generate the antenna weight and the RF modulator. Accordingly, it is desirable to provide an algorithm to maintain the antenna weight magnitude control. As shown in FIG. 4, antenna weight magnitude control loop 42 monitors the power in the combined signal. If the magnitude of the weight is small, the power of the combined signal is small. Alternatively, if the magnitude of the weight is large, the power of the combined signal is large. Power detector 43 of antenna weight magnitude control loop 42 compares the power of combined signal 36 with a threshold level. The difference between the power of combined signal 36 and the threshold level is filtered with low-pass filter (LPF) 44. The filtered output is fed forward through limiter 48 to variable gain amplifiers 46a, 46b to adjust the magnitude of the combined signal. The outputs of variable gain amplifiers 46a, 46b are used in correlators 47 of the MRC beamforming module 30 to derive the antenna weights (IW$_i$, QW$_i$, i=1,2,3 ... ) 33. A higher gain in variable gain amplifiers 46a, 46b produces a larger antenna weight and a lower gain in variable amplifiers 46a, 46b produces a smaller antenna weight. By varying the gain of variable gain amplifiers 46a, 46b in the baseband SUM channel signal paths, the magnitude of the antenna weight is adjusted to a proper level to keep the output signal power in a small range.

To achieve a fast beamforming operation, the LPF bandwidth and the bandwidth of the antenna weight magnitude control loop 42 should be wide. Wider loop bandwidth can lead to excessive fluctuations in the antenna weights. Limiter 48 is used to limit antenna weight fluctuations. Limiter 48 reduces weight fluctuation while maintaining a wide loop bandwidth in the antenna weight magnitude control loop 42.

Conventional RFIDs generally work by modulating the signal transmitted by the RFID reader and transmitting the modulated signal back to the RFID reader. Thus, the reader may simultaneously receive the RFID reader transmitted signal and the signal from the RFID. The reader must then suppress the RFID reader transmitted signal both in the RFID reader output, as well as in the weight generation circuitry. Since the RFID reader transmitted signal is generally orders of magnitude stronger than the signal from the RFID, this can be a significant issue. This suppression can be done using a variety of techniques, including a) filtering, b) the use of a power inversion algorithm in the smart antenna, c) signal cancellation, and d) a combination of a), b), and c). For example, for b), in FIG. 2, the beamforming algorithm used in beamforming module 30 could be power inversion, rather than as shown in FIG. 3. For example, a power inversion algorithm which can be used is described in U.S. Pat. No. 6,784,831, hereby incorporated by reference into this application.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A RFID system comprising: one or more RF tags; and a RF reader, said RF reader comprising a smart antenna wherein said smart antenna comprises: a plurality of antennas receiving input signals; means for weighting said input signals received by said plurality of antennas; and means for combining said weighted plurality of signals to form an output signal wherein said weights are determined by maximal ratio combining (MRC) to align phases of said input signals to the same phase and to scale said input signals in proportion to a square root of a received signal-to-noise ratio.

2. The RFID system of claim 1 wherein said weights are applied to a respective one at said input signals using a modulator.

3. A RFID system comprising: one or more RF tags; and a RF reader, said RF reader comprising a smart antenna wherein said smart antenna comprises; a plurality of antennas receiving input signals; means for weighting said input signals received by said plurality of antennas; and means for combining said weighted plurality of signals to form an output signal wherein weight used in said means for weighting are determined by: means for determining a complex error signal by a complex conjugate multiplication of each of said input signals and a reference complex signal; and means for low pass filtering said error signal to determine said antenna weights.

4. The RFID system of claim 3 wherein said reference complex signal is the output signal.

5. A RF reader for a RFID system comprising: means for receiving a plurality of input signals; means for weighting said plurality of input signals with weights; and means for combining said weighted plurality of signals to form an output signal further comprising; means for transmitting a signal towards a RF tag wherein a complex conjugate of said weights are used for transmitting said signal.

6. The RFID system of claim 5 wherein said weights are determined by means for determining a complex error signal determined by a complex conjugate multiplication of each of said individual signals and a reference complex signal; and means for low pass filtering said error signal to determine said weights.

7. A method for operating a RFID reader comprising the steps of: receiving a plurality of input signals; weighting said plurality of input signals; and combining said weighted plurality of signals to form an output signal wherein said weights are determined by maximal ratio combining (MRC) to align phases of said input signals to the same phase and to scale said input signals in proportion to a square root of a received signal-to-noise ratio.

8. The method of claim 7 further comprising the step of: maintaining a magnitude of said weights.

9. The method of claim 7 wherein said weights are applied to a respective one of said input signals using a modulator.

10. A method for operating a RFID reader comprising the steps of: receiving a plurality of input signals; weighting said plurality of input signals; and combining said weighted plurality of signals to form an output signal wherein said weights are determined by the steps of: determining a complex error signal by a complex conjugate multiplication of each of said input signals and a reference complex signal; and low pass filtering said error signal to determine said antenna weights.

11. A method for operating a RFID reader comprising the steps of: receiving a plurality of input signals; weighting said plurality of input signals with weights, combining said weighted plurality of signals to form an output signal; and transmitting a signal towards a RFID tag wherein a complex conjugate of said weights are used for transmitting said signal.

12. The method of claim 11 wherein said weights are determined by the steps of: determining a complex error signal by a complex conjugate multiplication of each of said individual signals and a reference complex signal; and low pass filtering said error signal to determine said weights.

* * * * *